(12) United States Patent
Yoon

(10) Patent No.: US 7,651,125 B2
(45) Date of Patent: Jan. 26, 2010

(54) AIR BAG FOR DRIVER'S SEAT OF VEHICLE

(75) Inventor: Jong Young Yoon, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 209 days.

(21) Appl. No.: 11/642,558

(22) Filed: Dec. 20, 2006

(65) Prior Publication Data

US 2008/0106085 A1    May 8, 2008

(30) Foreign Application Priority Data

Nov. 7, 2006    (KR)    ...................... 10-2006-0109682

(51) Int. Cl.
*B60R 21/16* (2006.01)
*B60R 21/203* (2006.01)
*B60R 21/239* (2006.01)
*B60R 21/26* (2006.01)

(52) U.S. Cl. ........................ 280/731; 280/729; 280/733; 280/736; 280/740; 280/742; 280/743.1; 280/743.2

(58) Field of Classification Search ................. 180/271; 280/728.1, 728.2, 728.3, 729, 731, 733, 737, 280/740, 742, 736, 743.1, 743.2; 296/68.1
See application file for complete search history.

(56) References Cited

U.S. PATENT DOCUMENTS 5,697,641 A * 12/1997 McGee et al. ............ 280/743.1
6,095,557 A * 8/2000 Takimoto et al. ............ 280/739
6,598,903 B2 * 7/2003 Okada et al. ............. 280/743.2
7,040,655 B2 * 5/2006 Igawa et al. ................. 280/739
7,134,691 B2 * 11/2006 Dunkle et al. ............ 280/743.2
7,152,875 B2 * 12/2006 Kai ............................. 280/739
7,334,812 B2 * 2/2008 Abe ........................... 280/729

FOREIGN PATENT DOCUMENTS

| JP | 2003-276554 | 10/2003 |
| JP | 2005-022523 | 1/2005 |
| JP | 2005-297715 | 10/2005 |
| KR | 1020030016896 A | 3/2003 |

* cited by examiner

*Primary Examiner*—Ruth Ilan
*Assistant Examiner*—James English
(74) *Attorney, Agent, or Firm*—Morgan, Lewis & Bockius LLP

(57) ABSTRACT

An air bag for a driver's seat of a vehicle that utilizes an inflator gas of low and high pressures, in which a twofold tether composed of first and second tethers is established inside the air bag for a driver's seat that is unfolded toward the driver when the vehicle collides with a collision object and the sewn portions of the first and second tethers are burst selectively according to the high and low pressures of gas generated from an inflator.

10 Claims, 4 Drawing Sheets

AIR BAG FOR DRIVER'S SEAT OF VEHICLE

CROSS-REFERENCE TO RELATED APPLICATION

This application claims the benefit of Korean Patent Application No. 10-2006-0109682, filed on Nov. 7, 2006, the entire disclosure of which is hereby incorporated by reference.

BACKGROUND OF THE INVENTION

1. Field of the Invention

The present invention relates to an air bag for a driver's seat of a vehicle that utilizes an inflator gas of low and high pressures, in which a twofold tether composed of first and second tethers is established inside the air bag for a driver's seat that is unfolded toward the driver when the vehicle collides with a collision object and the sewn portions of the first and second tethers are burst selectively according to a high or low pressure of gas generated from an inflator.

2. Description of Related Art

An air bag is a safety device for protecting a vehicle driver or passenger. Generally, when a vehicle collides with something, a sensor and an electronic control unit (ECU) detect the collision and the ECU operates an inflator to inflate a folded air bag cushion to prevent a driver or a passenger from bumping directly against vehicle interior. Air bags for a driver's seat, however, may cause fatal injuries to the face and neck region at an early stage of deployment.

SUMMARY OF THE INVENTION

The air bag for a driver's seat of a vehicle may include tethers that are selectively unfolded according to low and high pressures of gas generated from an inflator as described herein, thus protecting an adjacent passenger safely.

In an illustrative embodiment of the air bag, there is provided an air bag for a driver's seat for a vehicle comprising: a first tether including a first extension having a first flow hole, formed spaced along with an edge of a central plate sewn on the center of an upper air bag cover and extending toward a lower air bag cover through which a gas of low pressure generated from an inflator flows, and a penetrating hole, established opened in the first extension, through which a gas of high pressure generated from the inflator flows; and a second tether including a second extension having a second flow hole, formed inside the first tether, of which one end is fixed on the central plate and extends toward the lower air bag cover, and includes a penetration hole through which a gas of high pressure generated from the inflator flows, the second tether covering the second extension and being burst so as to tear away by the gas of high pressure generated from the inflator.

Moreover, the first and second tethers may be arranged in the form of an "X" or a "+".

In one embodiment, the central plate is moved forward by the gas generated from the inflator and sewn on the upper air bag cover to prevent an asymmetric unfolding of the air bag.

In addition, the first and second flow holes may be formed in the same size.

Moreover, the first and second extensions of the first and second tethers may be sewn to each other, and the first and second flow holes may be joined or sewn to be torn away by an inflator gas of low pressure.

Furthermore, the penetrating hole of the first tether may be sewn on the second tether not to tear away by a gas of low pressure generated from the inflator, but to tear away by a gas of high pressure generated from the inflator.

Accordingly, the first and second tethers tear away by a gas of high pressure generated from the inflator to be unfolded respectively, in which the gas of the inflator is emitted in the up, down, left and right directions of the first and second tethers to unfold the air bag.

BRIEF DESCRIPTION OF THE DRAWINGS

The above and other features of the present invention will be described with reference to certain exemplary embodiments thereof illustrated the attached drawings in which.

DETAILED DESCRIPTION OF THE INVENTION

Figure 1:
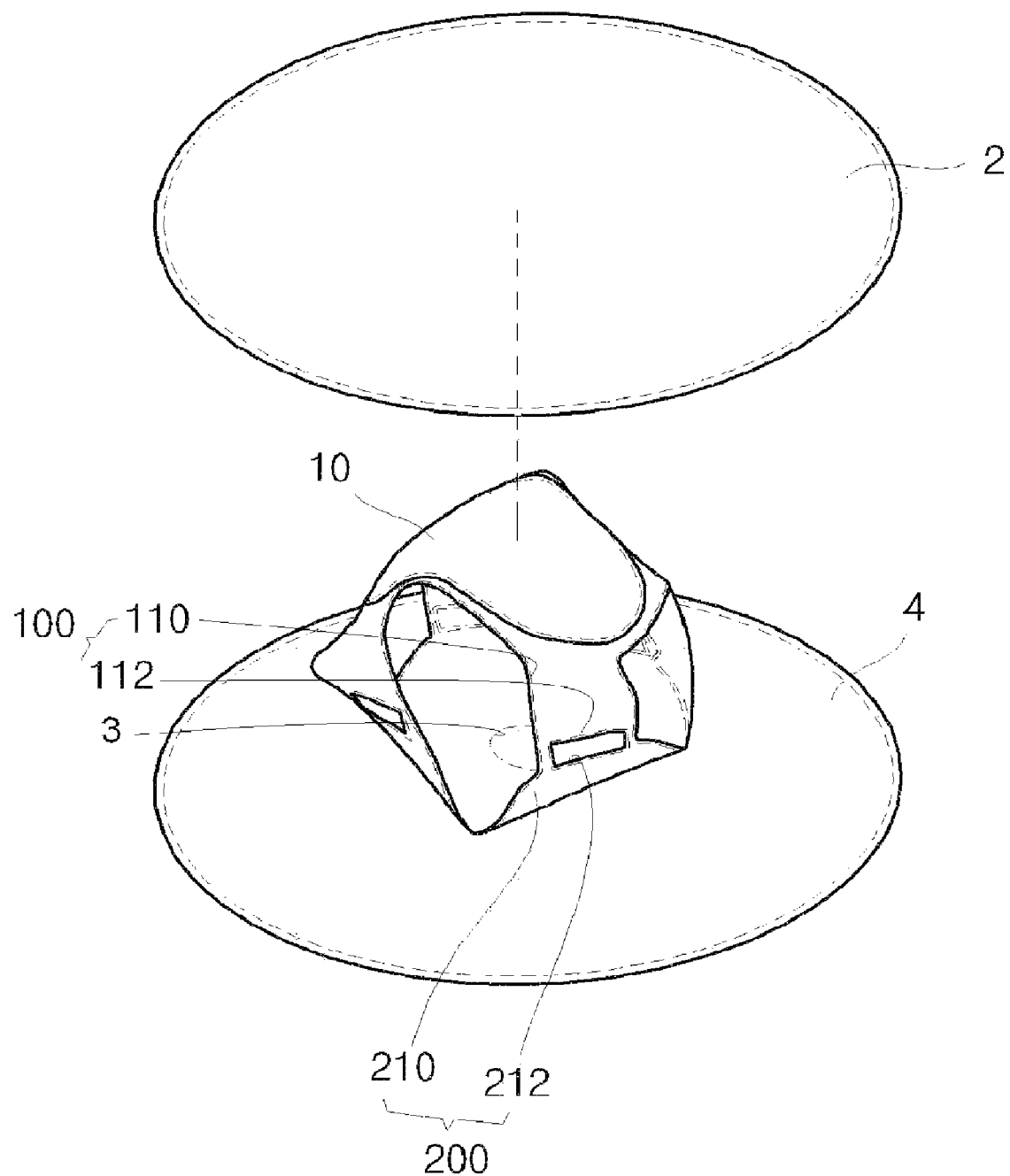
FIG. 1 is a diagram depicting an exemplary embodiment of an air bag for a driver's seat for a vehicle.
Figure 2:
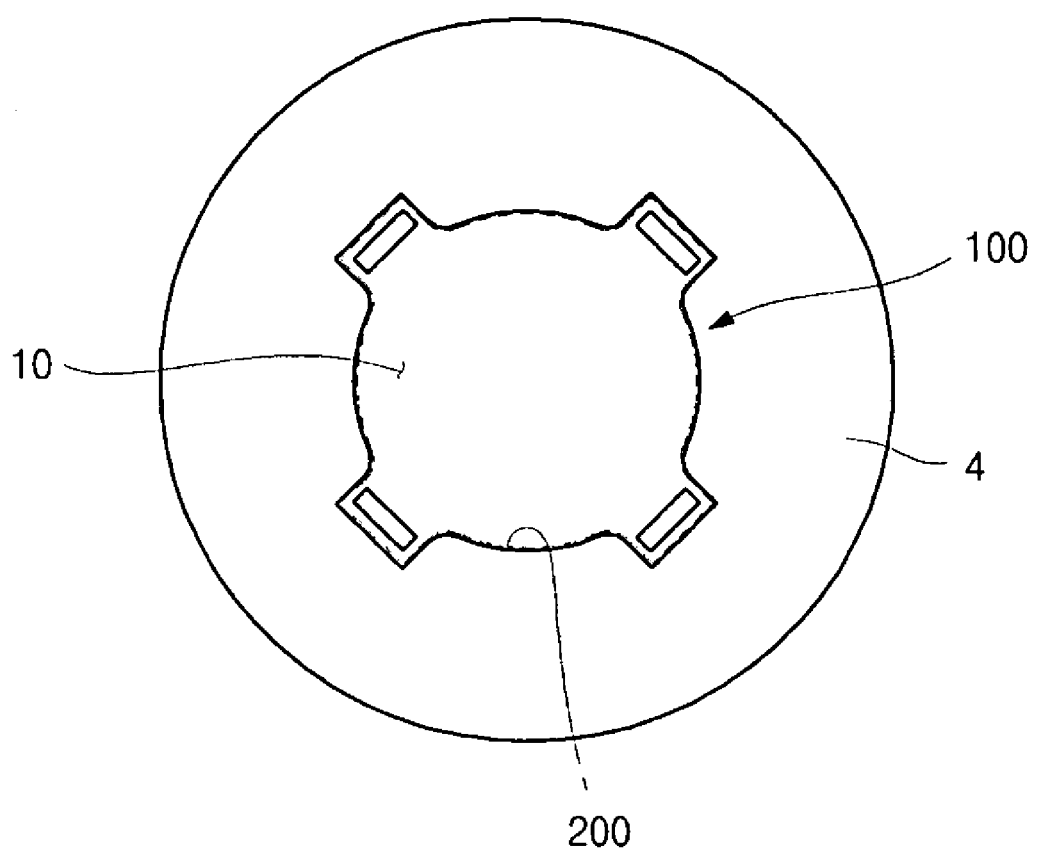
FIG. 2 is a diagram illustrating a state where an upper air bag cover is removed from the air bag of FIG. 1.

Hereinafter, preferred embodiments will now be described in detail with reference to the attached drawings.

Referring to FIGS. 1 to 4B, the air bag for a driver's seat for a vehicle in accordance with one embodiment of the invention comprises: a first tether 100 including a first extension 110 having a first flow hole 112, spaced along an edge of a central plate 10 that is sewn on to the center of an upper air bag cover 2. The first tether 110 extends toward a lower air bag cover 4, through which a gas of low pressure generated by an inflator may flow. The first tether may further include a penetrating hole 114 opened in the first extension 110. The penetrating hole 114 is provided for releasing gas of highgas pressure generated by the inflator. A second tether 200 underlying the first tether may be further provided. The second tether including a second extension 210 has a second flow hole 212 formed inside the first tether 100. One end of the second tether 210 is fixed on the central plate 10 and extends toward the lower air bag cover 4, through which a gas of high pressure generated from the inflator flows. Prior to deployment under high pressure, the second tether 200 may cover the second extension 210, the cover on the second extension and tearing away by the gas of high pressure generated from the inflator during a deployment of the air bag.

In an exemplary embodiment of the air bag, the first and second tethers are arranged in the form of an "X" or a "+".

In one embodiment of the air bag, the central plate 10 is sewn on to the upper air bag cover 2 and is moved forward by the gas generated from the inflator, thus preventing the asymmetric unfolding of the air bag.

In one embodiment of the air bag, the first and second flow holes 112 and 212 are formed in the same size.

In one embodiment of the air bag, the first extension 110 and the second extension 210 of the first tethers 100 and the second tether 200 are sewn to each other at a portion 230. By contrast, the first and second flow holes 112 and 212 are joined or sewn such that they tear away by the inflator gas of low pressure.

In one embodiment, the penetrating hole 114 of the first tether 100 is sewn at a portion 240 the second tether 200, not to tear away by a gas of low pressure generated from the inflator, but to tear away by a gas of high pressure generated from the inflator.

In one embodiment, the first and second tethers 100 and 200 tear away by the gas of high pressure generated from the inflator to be unfolded respectively, in which the gas of the inflator is emitted in the up, down, left and right directions of the first and second tethers 100 and 200 to unfold the air bag.

In use, the operational states of the air bag for a driver's seat of a vehicle configured as described above are as follows.

Figure 4A:
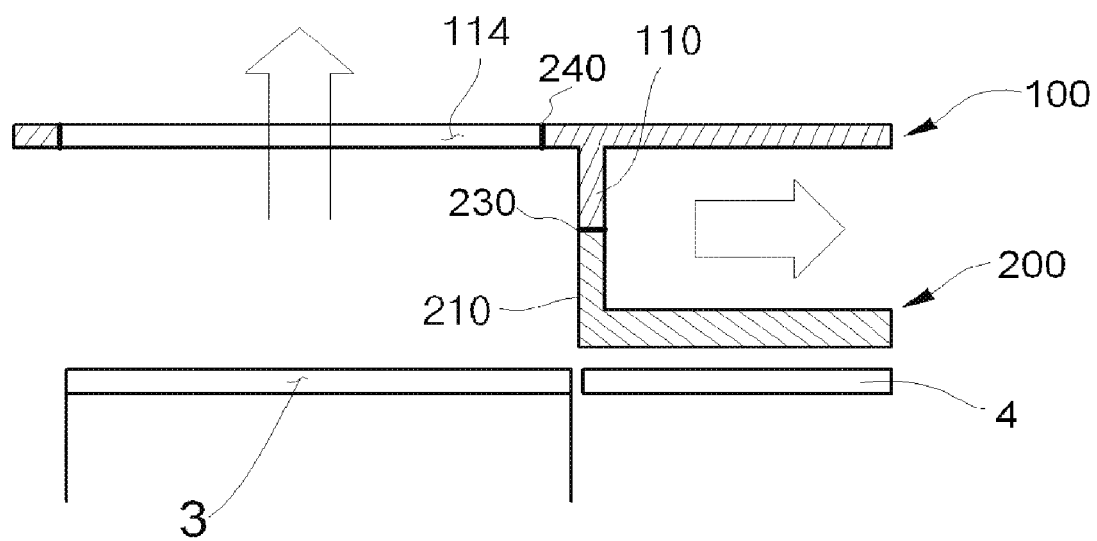
FIG. 4A is a cross-sectional view of the air bag of FIG. 3 taken along cut line A-A.
Figure 4B:
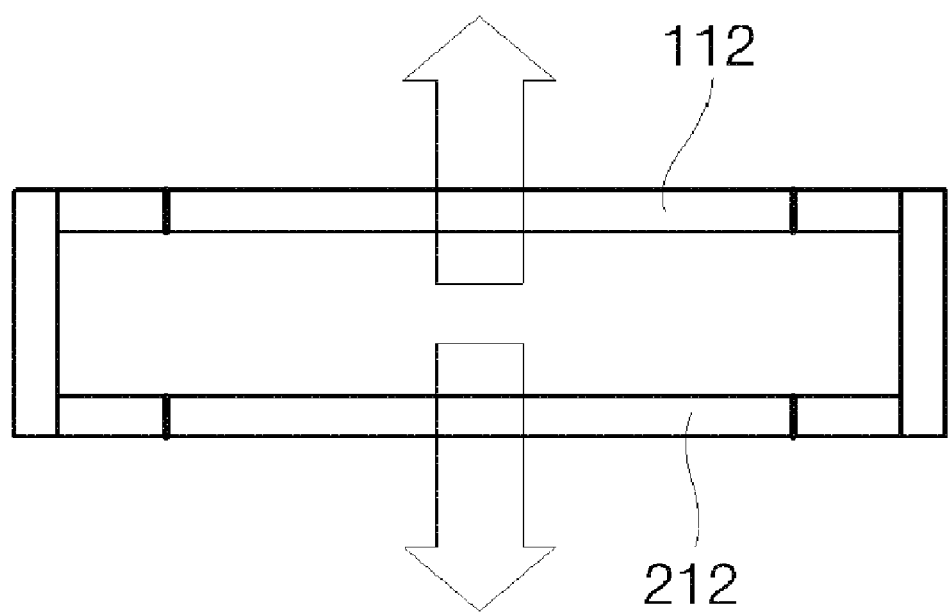
FIG. 4B is a cross-sectional view of the air bag of FIG. 3 taken along cut line B-B.

Referring to FIGS. 1 4B, when a vehicle driving along a road collides with an object, the collision is detected by a detection sensor (not shown) and a signal is transmitted to a control unit (not shown). The control unit operates on the signal transmitted from the detection sensor to determine whether the air bag for a driver's seat mounted in an air bag module for a driver's seat can operate.

If the vehicle collision occurs at a low speed, electric power is applied to a propellant of the inflator such that the inflator included in the air bag module is activated or deployed in a low pressure.

Figure 3:
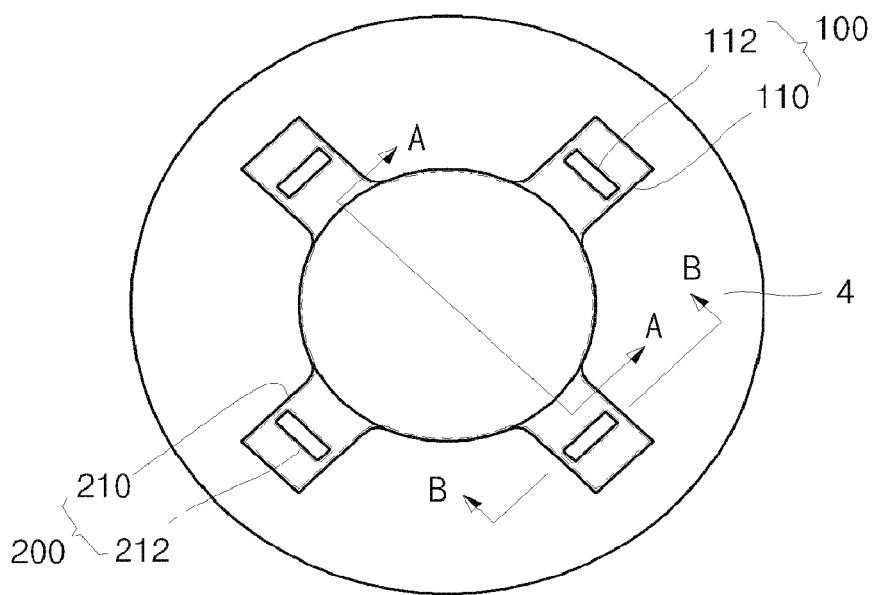
FIG. 3 is a plan view of the air bag of FIG. 2 showing the location of cross-sectional cut lines A-A and B-B.

The inflator gas generated as the inflator operates is supplied to a supply hole 3 connected to the inflator. In turn the supply hole supplies the inflator gas to the first and second flow holes 112 and 212 established in the first and second extensions 110 and 210 of the first and second tethers 100 and 200. As depicted in FIG. 3, since the first and second flow holes 112 and 212 are joined or sewn to readily tear away by the inflator gas of low pressure, the first and second flow holes 112 and 212 readily tear away by the inflator gas of low pressure 300, thus facilitating the gas supply into the air bag. Here, the central plate 10 is moved forward by the gas pressure generated from the inflator and the central plate 10 sewn on the upper air bag cover 2 prevents the asymmetric unfolding of the air bag.

If the vehicle collides with a collision object at high speed, the air bag is operated as follows.

Referring to FIGS. 1 to 4B, the inflator is activated according to the vehicle collision to emit a gas of high pressure through the supply hole 3. As shown FIG. 4A, the inflator gas of high pressure emitted to the supply hole 3 is supplied into the air bag and emitted in the up, down, left and right directions of the first and second tethers 100 and 200 as the sewn portion of the penetrating hole 114 of the first tether 100 sewn on the first and second flow holes 112 and 212 and the second tether 200 tear away as depicted by the arrows in the figure and, at the same time, the central plate 10 is also moved forward, thus preventing an injury to the driver due to the vehicle collision.

As described above, the air bag for a driver's seat of a vehicle may provide an effective means of preventing an injury to an adjacent passenger because the first and second tethers are selectively burst by the gas of high and low pressures generated from the inflator.

As above, preferred embodiments of the air bag have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. An air bag for a driver's seat of a vehicle, included in an air bag module mounted inside a steering wheel and configured by the combination of an upper air bag cover and a lower air bag cover, the air bag for the drivers' seat of the vehicle comprising:

a first tether including a first extension having a first flow hole spaced from an edge of a central plate sewn to the upper air bag cover and extending toward the lower air bag cover, through which a gas of a first threshold pressure generated from an inflator flows and a penetration hole in the first extension, and a second tether including a second extension having a second flow hole, formed inside the first tether, of which one end is fixed on the central plate and extends toward the lower air bag cover and, wherein the first and second tethers are configured to selectively open a fluid passage formed therebetween by the first threshold pressure, and wherein the second tether is sewn to the penetration hole of the first tether and tears away by a gas of a second threshold pressure generated from the inflator.

2. The air bag as recited in claim 1, wherein the first and second tethers are arranged in the form of an "X" or "+".

3. The air bag as recited in claim 1, wherein the central plate is sewn on the upper air bag cover and moved forward by the gas generated from the inflator such that symmetric unfolding of the air bag is facilitated.

4. The air bag for as recited in claim 1, wherein the first and second flow holes are formed in the same size.

5. The air bag as recited in claim 1, wherein one ends of the first and second extensions of the first and second tethers are sewn to each other, and the first and second flow holes are joined such that the one ends of the first and second extensions and the first and second flow holes tear away by the gas of the first threshold pressure.

6. The air bag as recited in claim 1, wherein the penetrating hole of the first tether is sewn with the second tether, such that the penetrating hole of the first tether does not tear away by the gas of the first threshold pressure generated from the inflator and tears away by the gas of the second threshold pressure generated from the inflator.

7. The air bag as recited in claim 1, wherein the first and second tethers tear away by the gas of the second threshold pressure generated from the inflator to be unfolded respectively, in which the gas of the inflator is emitted in the up, down, left and right directions of the first and second tethers to unfold the air bag.

8. The air bag as recited in claim 1, wherein the first threshold pressure is lower than the second threshold pressure.

9. The air bag as recited in claim 1, wherein one ends of the first and second extensions of the first and second tethers are sewn to each other.

10. The air bag as recited in claim 9, wherein the first and second flow holes are joined such that the first and second flow holes tears away by the gas of the first threshold pressure.

* * * * *